O. H. SCHRAEGER.
LOOSE LEAF BINDER.
APPLICATION FILED DEC. 11, 1906.
910,867.
Patented Jan. 26, 1909.
2 SHEETS—SHEET 1.
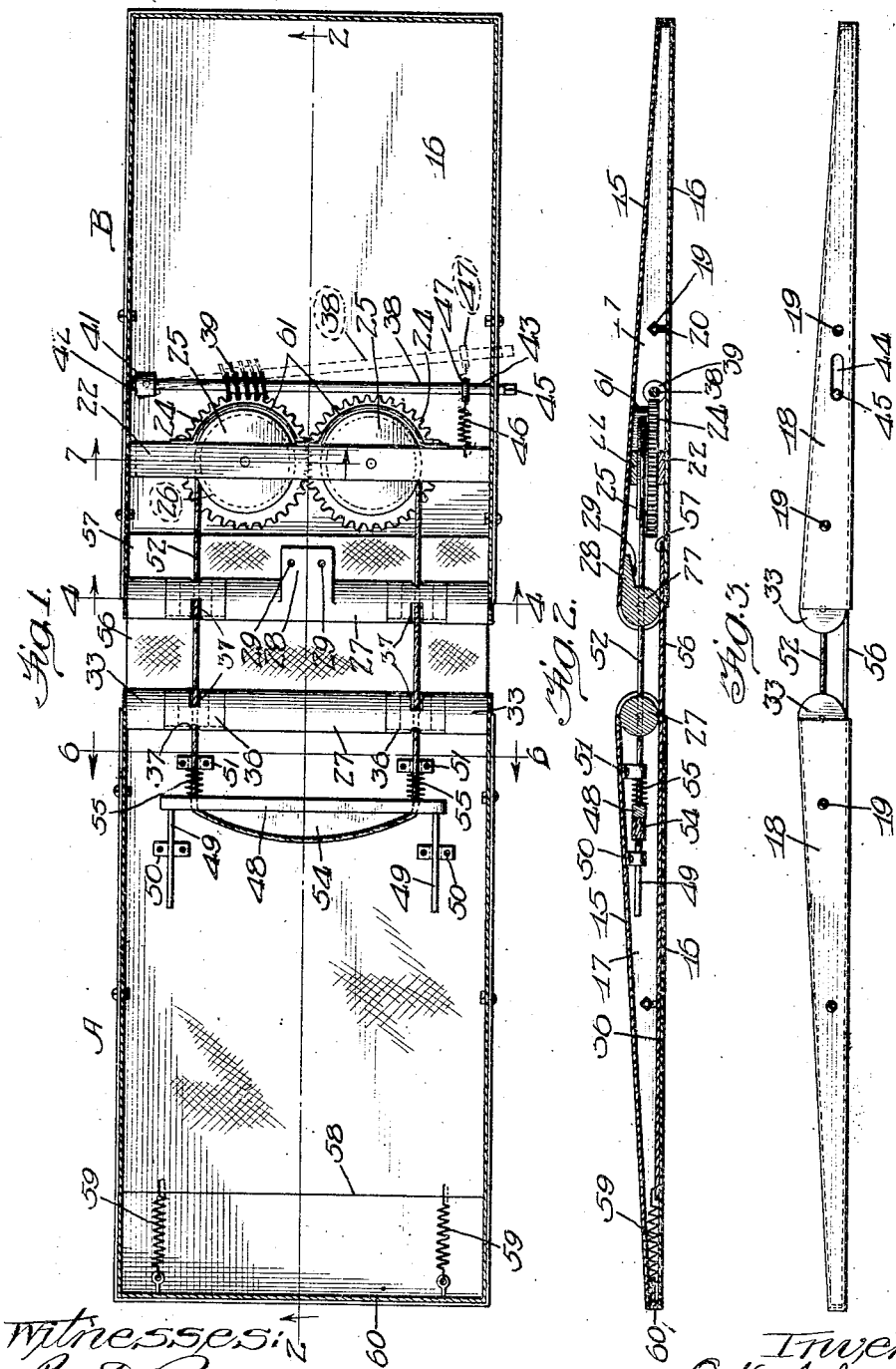

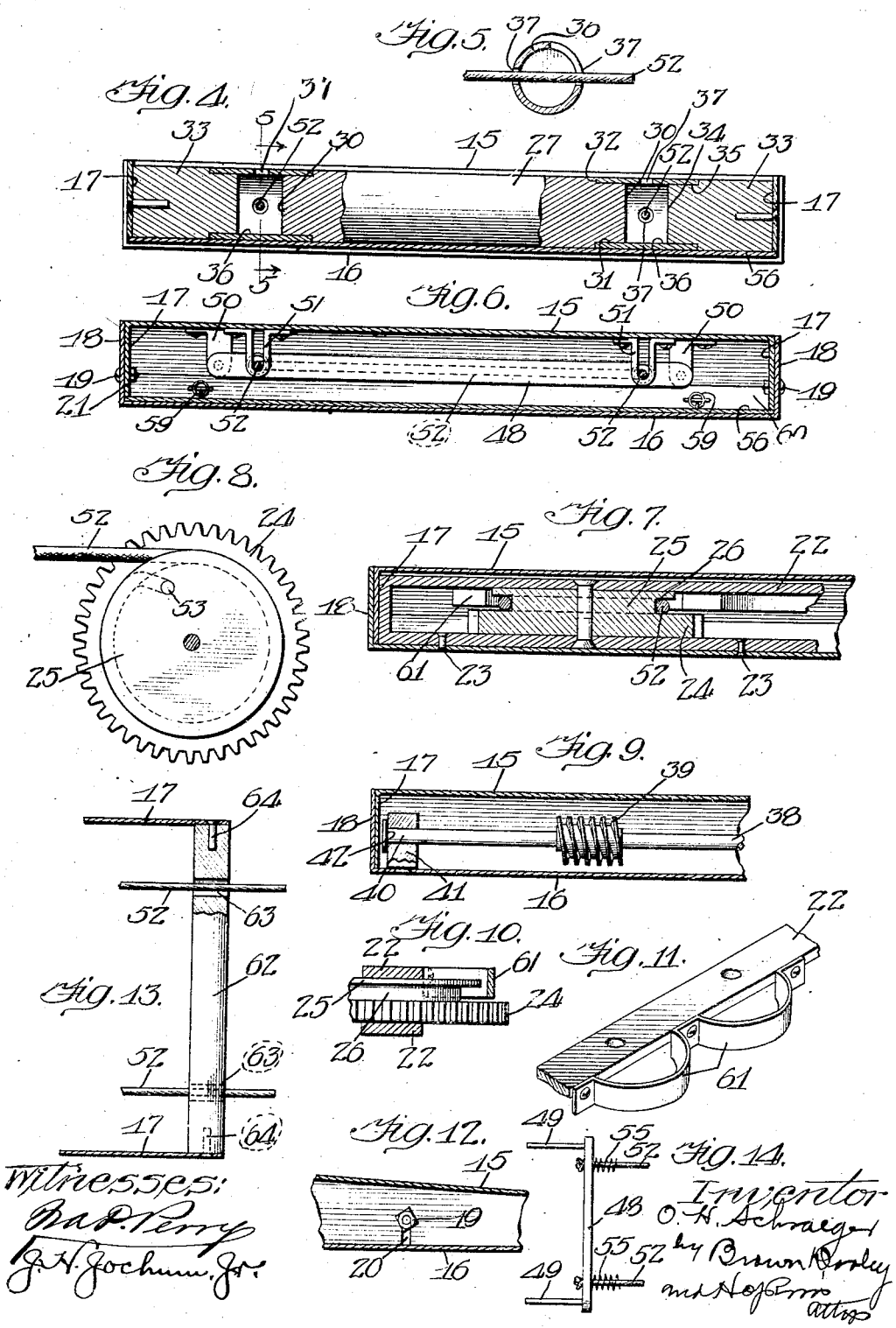

UNITED STATES PATENT OFFICE.

OTTO H. SCHRAEGER, OF KALAMAZOO, MICHIGAN.

LOOSE-LEAF BINDER.

No. 910,867.　　Specification of Letters Patent.　　Patented Jan. 26, 1909.

Application filed December 11, 1906. Serial No. 347,260.

*To all whom it may concern:*

Be it known that I, OTTO H. SCHRAEGER, a citizen of the United States, residing at Kalamazoo, county of Kalamazoo, State of Michigan, have invented certain new and useful Improvements in Loose-Leaf Binders, of which the following is a specification.

This invention relates to improvements in loose leaf binders and the object of the same is to provide an improved device of this character that will be simple, cheap and compact in construction, capable of easy manipulation and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of the invention, and in which—

Figure 1 is a top plan view partly in section of an improved binder constructed in accordance with the principles of this invention, in an open position. Fig. 2 is a longitudinal sectional view on line 2—2 of Fig. 1. Fig. 3 is a side elevation of Fig. 1. Fig. 4 is a sectional view on line 4—4, of Fig. 1. Fig. 5 is a sectional view on line 5—5 of Fig. 4. Fig. 6 is a sectional view on line 6—6 of Fig. 1. Fig. 7 is a sectional view on line 7—7 of Fig. 1. Fig. 8 is a detail view of one of the pulleys and its operating gear and a portion of the thong or flexible member secured thereto. Fig. 9 is a detail sectional view of the operating gear for the pulleys. Fig. 10 is a detail sectional view of the gear and pulley and shield for the flexible connecting member. Fig. 11 is a detail perspective view of the shield. Fig. 12 is a detail sectional view of a portion of one of the cover members. Fig. 13 is a modified form, partly in section, of one of the clamping members. Fig. 14 is a modified form of the thong or flexible connecting member.

Referring more particularly to the drawing, the same reference numerals designate similar parts throughout the several views and in this exemplification of the invention, the binder preferably comprises two cover sections, designated generally by the reference characters A—B. Each of these sections preferably comprises a top and bottom member 15, 16. These members are each provided with side flanges 17, 18 respectively, the side flanges 17 being adapted to be inserted within the flanges 18 and the two members 15, 16 are secured together in any suitable manner such as by means of headed screws or bolts 19, which pass through an aperture in the flanges 18 and registering open slots 20 in the flanges 17 and engage suitable nuts 21 on the inside of the flanges 17. When it is desired to separate these two members 15, 16 the screws or bolts 19 may be loosened and the open slots 20 in the flanges 17 will permit the member 15 to be readily removed. Secured within one of the sections, preferably the section B, and to the lower member 16 between the flanges 18 is a frame 22. This frame extends across member 16 and terminates short of the side flanges 18 thereof to permit the flanges 17 on the upper member or section 15 to be inserted within the space when the members are assembled. This frame 22 is of a height substantially equal to the height of the flanges 18 and comprises the top and bottom members spaced from each other, and said frame may be secured in position preferably adjacent one end of the section 16 in any suitable manner, such as by means of rivets 23 passing through the section 16 and the lower portion of the frame. Journaled within this frame 22 are gear wheels 24 arranged to mesh with each other and said gear wheels are preferably of such a diameter as to extend beyond the sides of the frame. A portion 25 of said gear wheels 24 is reduced and said portion is provided with a peripheral groove 26 to form a pulley, the diameter of which is somewhat smaller than the diameter of the gear 24. The pulley 25 and gear 24 are preferably formed integral with each other but if desired, they may be formed separately and secured together in any desired manner, as will be understood.

Suitable clamping members are secured between the top and bottom members 15, 16 of the respective sections and said clamping members preferably comprise a central section 27, which may be held stationary in any desired manner, preferably by means of the projection 28, which latter is secured to the upper section 15 by means of suitable bolts 29. The ends 30 of this central section are preferably reduced as at 31 to form shoulders 32 and said ends 30 terminate short of the side flanges 17 of the top member 15. Secured to the flanges 17 are end members or sections 33, which are preferably of a diameter equal to the diameter of the section 27. The extremities 34 of these end sections 33 terminate short of the ends 30 of the section 27 to form a space therebetween and said extremities are reduced as at 35 similar to the extremities 30 of the section 27. Sleeves or collars 36 are disposed between the extremities of the section 27 and the end sections 33, and are of a diameter to receive the reduced extremities 30, 34 of the respective members and said sleeves 36 are also of a length to fill the space so that the ends thereof will rest against the shoulders formed by the respective reduced extremities 31, 35 of the sections 27, 33. Passing transversely through the sleeves 36 and at a point preferably intermediate the extremities 30, 34 of the members 27, 33 are apertures 37.

A shaft 38 is arranged preferably transversely of the section 16 and said shaft is provided with a worm gear 39, which is adapted to mesh with one of the gear wheels 24. The shaft 38 is pivotally mounted within the section 16 in any desired or suitable manner, preferably by means of one extremity 40 thereof being journaled in a bearing 41, which is preferably pivoted to the section 16. The extremity 40 of this shaft 38 is preferably provided with an enlarged portion or head 42, which is adapted to engage the outer face of a pivoted bearing 41 to prevent displacement of the shaft. The other end 43 of this shaft preferably passes through registering slots or elongated apertures 44 in the side flanges 17, 18 on the opposite side of the cover section and the extremity 45 of the end 43 is preferably angular in configuration for a purpose to be set forth. The worm gear 39 is held normally in engagement with the respective gear 24 in any suitable manner, preferably by means of a yielding member 46, such as coil springs or the like, one end of which is preferably secured to the frame 22 and the other end to a collar 47, which loosely surrounds the shaft 38 adjacent the end remote from the pivoted bearing 41. Secured between the members 15, 16 of the cover section A is a similar clamping member comprising a central section 27, end sections 33 and rotatively mounted sleeves 36 disposed between the central and end sections and said sleeves 36 are also provided with transverse apertures 37, which are in alinement with the apertures 37 of the sleeves 36 in the clamping member of the other cover section.

Slidingly mounted in the section A, between the members 15, 16 thereof, is a member 48. This member extends transversely of the cover section and preferably parallel with the respective clamping member. This member 48 may be mounted for sliding movement within the cover section in any suitable manner, preferably by means of lateral projecting bars or portions 49, which latter pass through suitable bearings 50, preferably secured to the lower face of the member 15. Suitable guides 51 are also preferably secured to the member 15, preferably between the member 48 and the respective clamping member. One end of a thong or flexible member 52 passes through a suitable aperture 53 in one of the pulleys 25 and is secured to said pulley in any suitable manner. The thong or flexible member 52 then passes around the pulley and through the transverse aperture 37 in the respective sleeve 36 of the clamping member in the cover section B. From this sleeve the thong passes through the corresponding sleeve 36 in the opposite clamping member, then through the adjacent guide 51 through a suitable aperture in the sliding member 48 adjacent one end thereof, then across and through a similar aperture in the other end of the member 48, thence forwardly again through the adjacent guide 51, apertures 37 in the sleeves 36 at the other end of the respective clamping members, thence around the other pulley 25 and with its extremity passing through a similar aperture 53 in the pulley, at which point the said end may be suitably fastened. In order to prevent the thong or flexible member 52 from making an abrupt or sharp corner at the points where it passes through the apertures in and behind the member 48, a suitable block or extension 54 may be secured to the rear face of the member 48 and over which the said thong or flexible member is adapted to pass.

The leaves to be bound are provided with the usual slots in one end and said leaves are placed between the clamping members so that the thong or flexible member 52 between the clamping members will pass into the slots. When the desired number of leaves have been thus inserted, a suitable key or wrench may be applied to the angular extremity 45 of the shaft 38 so as to rotate the shaft and through the medium of the worm gear 39 and the gears 34, the thong or flexible member 52 will be wound upon the pulleys 25, thereby drawing the clamping members against the leaves. In order to hold the thong or flexible member 52 taut, suitable flexible members 55 may be provided, which surround the said thong or flexible member at the points preferably intermediate the sliding member 48 and the guides 51, and serve to place said thong or flexible member always under tension.

When it is desired to separate the clamping members to permit additional leaves to be inserted or for the removal of the leaves already in the binder, the worm gear 39 is moved out of engagement with the respective gear 24. This may be accomplished by moving the angular extremity 45 of the shaft 38 in the slot 44, against the tension of the yielding member 46, so as to cause the bearing 41 to turn upon its pivot, thereby disengaging the worm gear 39 and the respective gear. When the shaft is in this position the cover sections A, B may be quickly separated by drawing them apart, which will cause the thong or flexible member 52 to be paid out from the respective pulleys 25.

In order to cover the extremities of the leaves between the clamping members and to form a back for the binder, a suitable flexible member 56, such as leather, canvas, duck or the like, may be provided. One end 57 of this flexible member is preferably secured to the member 16 of the cover section B and said member passes between section 16 and the respective clamping member. The free end thereof is passed between the member 16 and the clamping member of the other section A of the cover and said end 58 is adapted to rest and move upon the member 16.

In order to place the free end of this member 56 under tension and to prevent the same from becoming accidentally displaced, the said end 58 may be secured within the cover section A in any suitable manner, such as by means of yielding members or springs 59, one end of which is secured to the end 58 and the free ends may be secured to the end flange 60 of one of the members 15, 16.

In order to prevent the ends of the thongs or flexible members 52 from becoming displaced and to direct them around the pulleys 25, suitable guides 61 may be provided and these guides may be secured in any desired manner to one side of the frame 22 so as to surround the projecting portion of the pulleys 25 and cover the peripheral grooves 26 therein.

If desired, the clamping members may be constructed of a single piece 62, which is provided with suitable transverse apertures 63 adjacent the ends thereof and said clamping member 62 may be pivotally supported between the ends of the members 15, 16 of the respective cover sections A, B in any suitable manner, such as by means of screws or bolts 64. With such an arrangement, it will be noted that the operating parts are located within the cover section and are remote from the back of the binder and when the cover is open the sections A, B will lie perfectly flat in order to permit of the ready operation of the respective parts. Furthermore, the cover sections being comprised of the separable members 15 and 16, the respective members may be removed to permit ready access to the operative parts by simply loosening the screws or bolts 19.

While in this exemplification of the invention the thong or flexible member 52 is shown and described as a single, continuous piece, it is to be understood that instead of passing the body of the member or thong 52 through the sliding member 48 and over the block 54, the said thong or member 52 may be made in two sections with the free extremity of each section secured to the member 48 in any suitable manner.

It is thought from the above description that the operation will be clear and in order that the invention might be fully understood, the details of an embodiment thereof have been thus specifically described.

What I claim is:—

1. In a device of the class described, the combination of separate cover sections, clamping members respectively pivoted to the ends of and located between the sections, a flexible member, means for securing one end of the flexible member to one of the sections, means carried by the other section and operatively related to the flexible member for tightening the same to adjust the clamping members, and separate means detachably related to the last said means for adjustably and automatically holding the latter in its adjusted position.

2. In a device of the class described, the combination of separate cover sections, clamping members respectively connected to the ends of and located between the sections, a flexible member, means for securing one end of said flexible member to one of the sections, means carried by the other section and operatively related to the other end of the flexible member for tightening the latter, means detachably engaging the tightening means for operating the same and yielding means for holding the last said means in engagement with the said tightening means.

3. In a device of the class described, the combination of separate cover sections, clamping members respectively connected to the ends of and located between the sections, a flexible member, means for securing one end of said flexible member to one of the sections, means carried by the other section and operatively related to the other end of the flexible member for tightening the latter, means detachably engaging the tightening means for operating the same, yielding means for holding the last said means in engagement with the said tightening means, and means for holding the flexible member normally under tension.

4. In a device of the class described, the combination of separate cover sections including clamping members, a flexible member for connecting said sections, means for yieldingly securing one end of said member to one of the sections, means carried by the other section and operatively related to the other end of the member, means operatively related to the last said means for operating the same to tighten the flexible members to adjust the clamping members, and an adjustable flexible member adapted to cover the space between the clamping members.

5. In a device of the class described, the combination of separate cover sections including clamping members, a flexible member for connecting said sections, means for yieldingly securing one end of said member to one of the sections, means carried by the other section and operatively related to the other end of the member, means operatively related to the last said means for operating the same to tighten the flexible members to adjust the clamping members, an adjustable flexible member adapted to cover the space between the clamping members, and means for maintaining the last said flexible member under tension.

6. In a device of the class described, the combination of separate cover sections, clamping members pivotally connected to the adjacent ends of said sections, a flexible member passing transversely through said members, means for yieldingly securing one end of the member to one of the sections, means carried by the other section and operatively related to the free end of the flexible member, means normally engaging the last said means for operating the same to tighten the flexible member for adjusting the clamping members, and means whereby the last said means may be moved out of operative position to permit the clamping members to be separated.

7. In a device of the class described, the combination of separate cover sections, including clamping members, a flexible member for connecting said sections, means for securing one end of said flexible member to one of the sections, means rotatively mounted on the other section and around which the other end of the flexible member is adapted to be wound to adjust the section and a common means for rotating the last said means and for automatically holding the same against rotation.

8. In a device of the class described, the combination of separate cover sections, including clamping members, a flexible member for connecting said sections, means for securing one end of said flexible member to one of the sections, means rotatively mounted on the other section and around which the other end of the flexible member is adapted to be wound to adjust the section, means normally engaging the last said means for rotating and for holding the same against independent rotation and means whereby the said rotating means may be moved out of operative position.

9. In a device of the class described, the combination of separate cover sections, including clamping members, a flexible member for connecting said sections, means for securing one end of said flexible member to one of the sections, means rotatively mounted on the other section and around which the other end of the flexible member is adapted to be wound to adjust the section, means for operating the adjusting means, means normally engaging the operating means for yieldingly holding the same in engagement with the adjusting means, said operating means being adapted to be moved out of operative position and against the tension of said yielding means.

10. In a device of the class described, the combination of separate cover sections including clamping members, a flexible connecting member, means for securing one end of the member to one of the sections, a pulley journaled to the other section, and to which the free end of the flexible member is secured, a gear operatively related to the pulley, and a common means engaging said gear for rotating the pulley to wind the flexible member thereon to adjust the clamping members and holding the pulley against rotation.

11. In a device of the class described, the combination of separate cover sections including clamping members, a flexible connecting member, means for securing one end of the member to one of the sections, a pulley journaled to the other section, and to which the free end of the flexible member is secured, a gear operatively related to the pulley, and means engaging said gear for rotating the pulley to wind the flexible member thereon to adjust the clamping members, said means being adapted to be moved out of engagement with the gear to permit the pulley to be freely rotated when the cover sections are separated.

12. In a device of the class described, the combination of separate cover sections including clamping members, a flexible connecting member, means for yieldingly securing one end thereof to one of the sections, a pulley journaled to the other section, around which the free end of the flexible member is adapted to be wound, a gear operatively related to the pulley, means normally engaging the gear for operating the same to rotate the pulley and yielding means for normally holding the operating means in engagement with the gear, said means being adapted to be moved out of engagement with the gear and against the tension of the yielding means.

13. In a device of the class described, the combination of separate cover sections, including clamping members, a flexible connecting member secured between its ends to one of the sections, intermeshing gears journaled to the other section, pulleys operatively related to the gears and around which the free ends of the flexible member are adapted to be wound, and an operating gear engaging one of the first said gears for rotating the pulleys.

14. In a device of the class described, the combination of separate cover sections, including clamping members, a flexible connecting member secured between its ends to one of the sections, intermeshing gears journaled to the other section, pulleys operatively related to the gears and around which the free ends of the flexible member are adapted to be wound, a shaft, a gear operatively related to the shaft and engaging one of the first said gears, and means for shifting the shaft to move the last said gear out of engagement with the first said gear.

15. In a device of the class described, the combination of separate cover sections, including clamping members, a flexible connecting member secured between its ends to one of the sections, intermeshing gears journaled to the other section, pulleys operatively related to the gears and around which the free ends of the flexible member are adapted to be wound, a shaft, a gear operatively related to the shaft and engaging one of the first said gears, yielding means for holding the last said gear in engagement with the first said gear for operating the pulleys, and means whereby said shaft may be shifted against the tension of the yielding means to move the last said gear out of operative position.

16. In a device of the class described, the combination of separate cover sections including clamping members, a flexible connecting member secured between its ends to one of the sections, intermeshing gears journaled to the other section, pulleys operatively related to the gears and around which the free ends of the flexible members are adapted to be wound, a pivoted bearing, a shaft, one end of which is journaled in the bearing, means for adjustably supporting the other end of the shaft, a gear operatively related to the shaft and normally engaging one of the first said gears to rotate the pulleys when the shaft is operated, and yielding means for normally holding the shaft in operative position.

17. In a device of the class described, the combination of separate cover sections including clamping members, a flexible connecting member secured between its ends to one of the sections, intermeshing gears journaled to the other section, pulleys operatively related to the gears and around which the free ends of the flexible members are adapted to be wound, a pivoted bearing, a shaft, one end of which is journaled in the bearing, means for adjustably supporting the other end of the shaft, a gear operatively related to the shaft and normally engaging one of the first said gears to rotate the pulleys when the shaft is operated, a collar loosely surrounding the shaft and a yielding member for holding the shaft in operative position, one end of said member being secured to the collar and the other to a stationary support.

18. In a device of the class described, the combination of separate cover sections, including clamping members, a flexible connecting member, means for yieldingly securing said member between its ends to one of the sections, intermeshing gears journaled to the other section, pulleys operatively related to the gears and around which the ends of the flexible member are adapted to be wound, a shaft, means for pivotally supporting one end of the shaft, means for supporting the other end of the shaft, a gear on the shaft normally engaging one of the first said gears, and yielding means operatively related to the other end of the shaft and adapted to hold the last said gears in engagement, said shaft being adapted to be moved about its point of pivotal support and against the tension of the yielding means to disengage the gear.

19. In a device of the class described, the combination of separate cover sections, including clamping members, a flexible connecting member, means for yieldingly securing said member between its ends to one of the sections, intermeshing gears journaled to the other section, pulleys operatively related to the gears and around which the ends of the flexible member is adapted to be wound, a shaft, means for pivotally supporting one end of the shaft, means for supporting the other end of the shaft, a gear on the shaft normally engaging one of the first said gears, yielding means operatively related to the other end of the shaft and adapted to hold the last said gears in engagement, said shaft being adapted to be moved about its point of pivotal support and against the tension of the yielding means to disengage the gear, a second flexible member secured by one end to one of the sections and yielding means for securing the free end to the other section.

20. In a device of the class described, the combination of separate cover sections including clamping members, a flexible connecting member, a member slidingly mounted on one of the sections and to which one end of the flexible member is secured, means mounted on the other section and engaging the free end of the flexible member for tightening the same to adjust the sections, and means operatively related to the sliding member for maintaining the flexible member under tension.

21. In a device of the class described, the combination of separate cover sections including clamping members, a flexible connecting member, means for securing said member between its ends to one of the sections, pulleys journaled to the other section and around which the free ends of the flexible member are adapted to be wound, a guard for said pulleys, and means operatively related to the pulleys for rotating the same to tighten the flexible member and adjust the sections.

22. In a device of the class described, the combination of separate cover sections including clamping members, a flexible connecting member, means for securing said member to one of the sections, means including a pulley journaled to the other section for securing the flexible member thereto and around which said member is adapted to be wound, and means operatively related to the pulley for rotating the same to tighten the flexible member to adjust the sections.

23. In a device of the class described, the combination of separate cover sections including clamping members, a flexible connecting member, means for securing said member to one of the sections, means including a pulley journaled to the other section for securing the flexible member thereto and around which the said member is adapted to be wound, and interengaging and separable means operatively related to the pulley for rotating the same to tighten the flexible member to adjust the sections.

In testimony whereof I have signed my name to this specification, in the presence of two subscribing witnesses, on this 4th day of December A. D. 1906.

OTTO H. SCHRAEGER.

Witnesses:
FRANK S. WESTON,
DONALD O. BONDEMAN.